United States Patent [19]  
Ayers

[11] Patent Number: 4,974,995  
[45] Date of Patent: Dec. 4, 1990

[54] PRESSURE ACTUATED BUOY FLATTENER  
[75] Inventor: Ray R. Ayers, Houston, Tex.  
[73] Assignee: Shell Oil Company, Houston, Tex.  
[21] Appl. No.: 750,651  
[22] Filed: Jun. 28, 1985

Related U.S. Application Data  
[63] Continuation of Ser. No. 113,985, Jan. 21, 1980, abandoned.

[51] Int. Cl.⁵ .............................................. F16L 1/04  
[52] U.S. Cl. ................................................... 405/162  
[58] Field of Search ................. 405/162, 170, 171, 200

[56] References Cited  
U.S. PATENT DOCUMENTS

| | | | |
|---|---|---|---|
| 2,350,883 | 6/1949 | Duttweiler | 9/10 |
| 3,192,621 | 7/1965 | Bauer et al. | 29/510 |
| 3,425,115 | 2/1969 | Handwerk et al. | 29/421 |
| 3,620,028 | 11/1971 | Wilde . | |
| 3,727,417 | 4/1973 | Shaw . | |
| 3,768,269 | 10/1973 | Broussard et al. | 61/72.3 |
| 4,037,425 | 7/1977 | Berg | 405/200 |
| 4,067,199 | 1/1978 | Jegousse | 405/171 |
| 4,121,529 | 10/1978 | Smith | 9/8 R |
| 4,159,189 | 6/1979 | Todd et al. | 405/171 |

FOREIGN PATENT DOCUMENTS  
1318603  5/1963  France .

Primary Examiner—John E. Murtagh

[57] ABSTRACT

Pressure-triggering buoys are constructed of prebuckled pipe segments and attached to an offshore structure or pipeline under construction. The attached buoys move with the structure or newly added pipe segment toward the sea bottom, easing the descent. As the structure or segment of pipeline reaches a predetermined depth, the buoy attached thereto collapses, causing the structure or segment of pipeline to be heavier. In the instance of a pipeline, this collapse, in turn, causes the adjacent upper segment of pipeline to move lower, causing the next buoy to collapse, and so on.

4 Claims, 3 Drawing Sheets

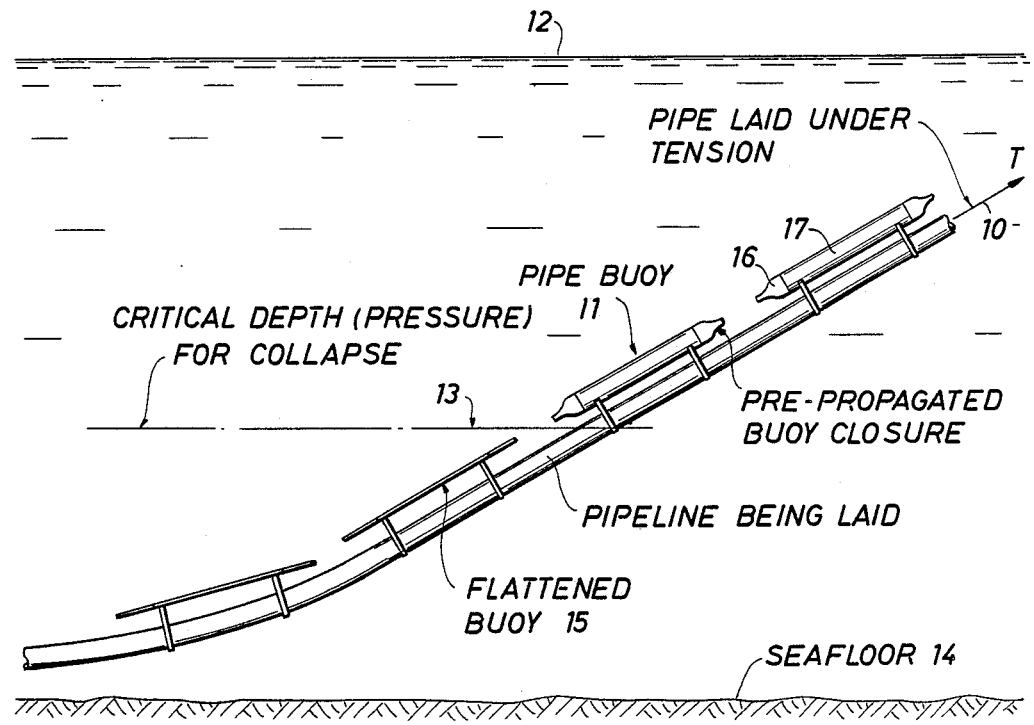
FIG. 1
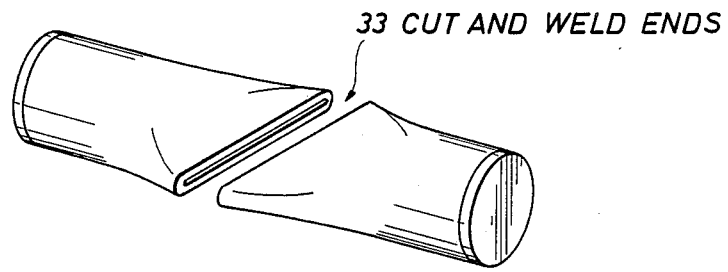
FIG. 3C  CUT PIPE IN HALF AND WELD SHUT THE ENDS. PLACE RING HOLD IN FLATTENED TIP, MAKING SURE THE PIPE ELEMENT REMAINS PRESSURE TIGHT.

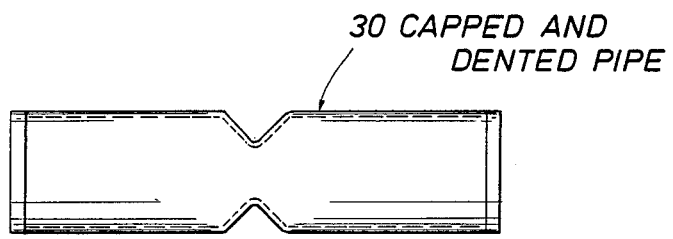
FIG. 3A MECHANICALLY DENT THE CENTER OF A CAPPED STUB PIPE.
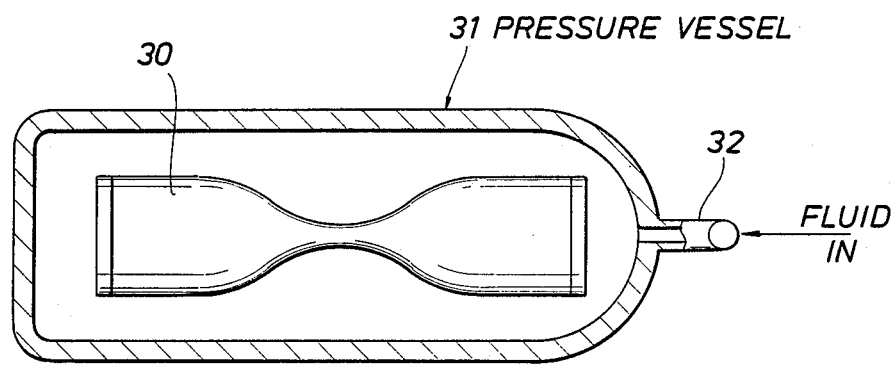
FIG. 3B PLACE PIPE IN PRESSURE VESSEL AND PROPAGATE BUCKLE SOMEWHAT FURTHER BY PUMPING HYDRAULIC FLUID (OR WATER) INTO THE VESSEL. NOTE THE PRESSURE REQUIRED TO PROPAGATE THE BUCKLE: THIS WILL BE RELEASE PRESSURE OF THE RELEASE MECHANISM.

PRESSURE ACTUATED BUOY FLATTENER

This is a continuation of application Ser. No. 06/113,985, filed Jan. 21, 1980, now abandoned.

BACKGROUND OF THE INVENTION

In subsea contruction and repair activities it is often required to attach one or more buoys to heavy structures or pieces of equipment to facilitate subsea emplacement. In such a way the effective underwater weight is reduced to a manageable value, minimizing the chances of damage during subsea installation and minimizing surface crane requirements after launching and during lowering and placement of the structures. Connections between the buoys and the structure are often made with bolts, eyes, hooks and other hardware. If it is necessary to release the buoys, this can be done with the direct help of divers, but it is considered safer to release the connections remotely, using explosives or acoustically triggered release mechanisms. Unfortunately, actively triggered mechanisms can be triggered accidentially and can fail to trigger when needed.

The use of such buoys is particularly attractive for laying a pipeline in deep water from a laybarge. It has been the general practice in the art to provide stability and support to a pipestring during an offshore pipe laying operation by means of a stinger, which is a mechanical structure extending from a hinged joint at the rear of the barge to or toward the submarine floor. However, a stinger must be quite long for laying a pipeline in deep water, for example 200 to 1000 feet or more. As a result such a stinger is expensive, difficult to control, and vulnerable to weather damage. Accordingly, in laying a deep water pipeline, buoys are used as an alternative to stingers for supporting the pipestring during the pipelaying operation. U.S. Pat. No. 3,727,417 discloses a system for laying underwater pipeline using buoyant spheres connected by a cable which are attached to the pipeline at calculated intervals. As the pipeline is laid, it forms a sloping curve, and as the pipeline reaches bottom, the spheres are released and float to the surface. U.S. Pat. No. 3,620,028 discloses a similar system for laying underwater pipelines wherein cable-connected floats are attached to the pipeline at selected intervals; a release mechanism disengages the floats as the pipeline reaches the bottom, and the floats rise to the surface where they are collected. Other pertinent art includes U.S. Pat. Nos. 3,262,275; 3,765,185; 3,795,115; 3,835,655; 3,909,774; 3,921,562. From this art, it is evident that there is no means for utilizing flotation to lay a pipestring which is both inexpensively constructed and fully reliable to trigger at a selected water pressure. However, such means is provided by the present invention, as will be evident from the following disclosure.

SUMMARY OF THE INVENTION

Apparatus is provided by the present invention for use in deploying a structure below the surface of water by a controlled descent. The structure may be a submarine pipeline, equipment for an offshore oil rig, or the like.

More specifically, a collapsible buoy is provided by the present invention for use in laying a submarine structure or pipeline. The buoy is a partially buckled hollow vessel susceptible to further buckling at a preselected water pressure. Preferably, the buoys are relatively long lengths of thin-walled pipe with thicker walled, partially buckled end closures. These buoys, after collapsing, remain on bottom with the structure or pipeline, adding weight to the structure or pipeline for stability, but minimizing drag forces due to cross currents because of a flattened profile.

Accordingly, the present invention pertains to buoys or other pressure vessels of cylindrical or near cylindrical shape with enclosures therefor which are partially buckled or collapsed so that when the external pressure differential exceeds a predetermined value, the buoy will flatten and thus lose most of its buoyancy. Such buoys can be used in offshore oil and gas exploration/production activities including construction and repair, to trigger any type of process such as detonating an explosive at a predetermined water depth, or in laying a long string of buoyed pipeline while the string is tensioned by a tug or similar tow vessel. As a given segment of the pipeline reaches the predetermined depth, the buoy attached thereto collapses, causing that segment of pipeline to become heavier. This in turn causes the adjacent upper segment of the pipeline to move lower, causing the next buoy to collapse as the process is repeated continuously while the pipeline is being laid. Alternatively, the buoy can be continuous or in long strings.

BRIEF DESCRIPTION OF THE DRAWINGS

FIG. 1 discloses a pipelay application of the invention.

FIGS. 3A, 3B and 3C show the steps involved in making end closures for the collapsible buoys of the invention.

DESCRIPTION OF PREFERRED EMBODIMENT

Figure 2:
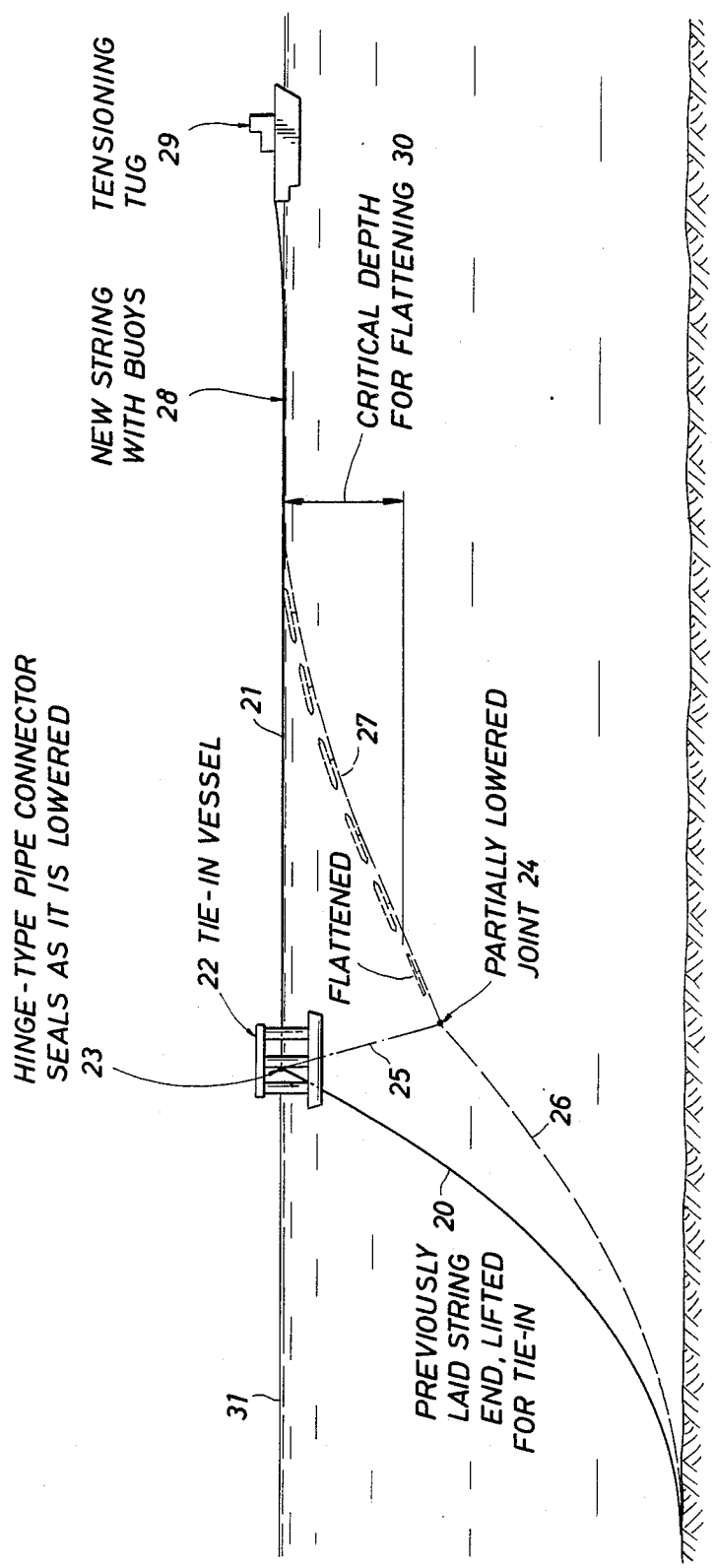
FIG. 2 depicts another pipelay application of the invention.

The present invention provides a technique for utilization of a failure mechanism, i.e., the gross flattening of a cylindrical pressure vessel under external pressure, to perform useful work through the passive, pressure actuated release of a buoy from the structure or equipment it is supporting. The nature of the so-called propagating buckle of a cylindrical vessel under external pressure is such that there is a large change in shape from, for instance, a round pipe to its fully flattened shape. In this way the actuation, or triggering, of the mechanism can be made to flatten and significantly reduce the internal volume. Thus, a "deflatable" metal buoy can result, one that can be pressure activated to collapse.

Referring now to the drawings, and in particular to FIG. 1 thereof, there is shown a means for rapidly laying a submarine pipeline with collapsible pipe buoys. It will be understood that other structures may be substituted for the pipeline in practice of the invention. As pipeline 10 passes over the stern of a ship (not shown), buoys 11 are attached, and the pipeline and buoys descend beneath water level 12 to a critical water depth 13 (designated by a dotted line) where collapse of the buoys occurs. Then the pipeline settles down to the sea floor 14 with attached collapsed buoys 15, without the stresses which might otherwise occur with the use of a stinger for pipe laying.

Pipe buoy 11 has partially collapsed or buckled end closures 16 which are integrally welded or otherwise attached to open ended vessels 17 of cylindrical or near cylindrical shape. The open ended vessel 17 is of relatively long length, e.g. from 1 pipeline diameter to continuous, of thin-walled pipe, e.g., with a diameter to thickness ratio greater than 30 (for steel, lower for lighter metals). The end closures 16 have thicknesses the same as or thicker than the vessel 17. The partially collapsed or prepropagated end closure facilitates collapse of the entire buoy 11 by propagating buckle mechanism at a selected water pressure.

In FIG. 2 there is shown a string tie-in pipe laying arrangement. A previously laid pipe string 20 is lifted up for tie-in to additional pipe string 21 by tie-in ship 22. A hinge-type pipe connector 23, which seals as it is lowered, is attached to and connects lines 20 and 21. Reference may be had to an eccentric hinge as in application Ser. No. 339,607, filed Jan. 15, 1982. Partially lowered joint 24 (shown in FIG. 2 in phantom only) is the sealed joint corresponding to connector 23 and held by line 25 to ship 22. The previously laid pipe string 20 then assumes the position of pipe string 26 (shown also in phantom) and new line 21 drops to the level of line 27 (in phantom). Buoys 28 are added to line 27 which is held by a tensioning tug 29 or similar means. Once the buoys 28 reach the critical depth 30 below the water surface 31, shown by a dotted line, the buoys substantially completely flatten and are lowered along with the pipeline to sea floor 32.

As a pipe buoy collapses from one end to the other, the pneumatic pressure rises from ambient at the initiation of collapse to a value at which the pressure difference (external minus the internal pressure) is insufficient to "drive" the buckle further. Then the progressive buckling will stop, leaving some air inside. To make the pipeline heavier on bottom, an opening in the pipe buoy can be placed near the position where buckling would stop. This opening could be covered by a cover, pressed against the opening by a band around the pipe buoy to effect a seal. When the buckle passes through the band, the opening moves away from the cover, and the air exhausts from the buoy by relative buoyancy forces. The buoy thus achieves its maximum weight in this manner. Other standard types of air removal means, such as valves, could be used as well.

In FIG. 3, the steps of making a prebuckled or precollapsed pipe for the pipe closures of the buoys are shown in steps (A), (B) and (C). In Step (A), a container such as a capped pipe 30 is mechanically dented in the center. Containers which are triangular, rectangular or elliptical shapes may be employed, and other techniques for denting the container may be effected using presses, hammers, etc. In Step (B), a pressure vessel 31 encompasses the capped and dented pipe 30 and a hydraulic fluid 32 under pressure is passed thereinto. The buckle initiated in Step (B) is propagated by the hydraulic fluid. The pressure required to propagate the buckle is noted since this will become the characteristic collapse pressure of the buoy. In Step (C), the pipe is cut in half and welded or otherwise closed at mid-section 33.

What is claimed is:

1. A method for laying a submarine structure comprising, attaching a partially buckled, hollow metal metal buoy to the structure, said buoy being susceptible to further buckling only beginning at a preselected water pressure, deploying the structure into water, and allowing the buoy to further buckle when the buoy reaches a water depth having a pressure equal to said preselected pressure.

2. A method for laying a submarine structure comprising, attaching a partially buckled, hollow, non-elastic buoy to the structure, said buoy being susceptible to further buckling only beginning at a preselected water pressure, deploying the structure into water, and allowing the buoy to further buckle when the buoy reaches a water depth having a pressure equal to said predetermined pressure.

3. A method for adding a pipeline segment to an on-bottom segment of a pipeline comprising, attaching a partially buckled, hollow metal buoy to the pipeline segment, said buoy being susceptible to further buckling at a preselected water pressure, deploying the pipeline segment into water, and allowing the buoy to further buckle when the buoy reaches a water depth having a pressure equal to said preselected pressure.

4. The method of claim 3 wherein the pipeline segment is added under tension by a vessel.

* * * * *